(12) United States Patent
Park

(10) Patent No.: US 9,829,940 B2
(45) Date of Patent: Nov. 28, 2017

(54) SEMICONDUCTOR DEVICE, SEMICONDUCTOR SYSTEM, AND METHOD FOR CONTROLLING THE SAME

(71) Applicant: SAMSUNG ELECTRONICS CO., LTD., Suwon-si, Gyeonggi-Do (KR)

(72) Inventor: Jinpyo Park, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/738,178

(22) Filed: Jun. 12, 2015

(65) Prior Publication Data

US 2016/0062448 A1    Mar. 3, 2016

(30) Foreign Application Priority Data

Sep. 2, 2014    (KR) .................. 10-2014-0116257

(51) Int. Cl.
| | |
|---|---|
| *G06F 9/00* | (2006.01) |
| *G06F 1/20* | (2006.01) |
| *G06F 1/30* | (2006.01) |
| *G06F 11/00* | (2006.01) |

(52) U.S. Cl.
CPC .............. *G06F 1/206* (2013.01); *G06F 1/30* (2013.01); *G06F 11/00* (2013.01)

(58) Field of Classification Search
CPC ............. G06F 1/206; G06F 1/30; G06F 11/00
USPC ....... 713/320, 324, 501, 323, 322, 340, 300; 324/750.03; 345/501; 714/43
See application file for complete search history.

(56) References Cited

U.S. PATENT DOCUMENTS

| | | | |
|---|---|---|---|
| 6,895,530 B2 | 5/2005 | Moyer et al. | |
| 7,324,516 B2* | 1/2008 | Daniel ................ | H04L 69/08 370/392 |
| 8,347,129 B2 | 1/2013 | Paik | |
| 8,392,695 B1 | 3/2013 | Lachwani et al. | |
| 8,484,496 B2 | 7/2013 | Anderson et al. | |
| 8,694,830 B2 | 4/2014 | Balkan et al. | |
| 2005/0055591 A1 | 3/2005 | Cho | |
| 2005/0144488 A1* | 6/2005 | Lee ................ | G06F 1/3209 713/300 |
| 2006/0242447 A1* | 10/2006 | Radhakrishnan ... | G06F 13/1668 713/501 |
| 2008/0294296 A1* | 11/2008 | Liu ................ | G05D 23/1917 700/300 |
| 2010/0117579 A1* | 5/2010 | Culbert ................ | G06F 1/20 318/471 |

(Continued)

FOREIGN PATENT DOCUMENTS

| | | |
|---|---|---|
| KR | 1020010061344 | 7/2001 |
| KR | 1020080095520 | 10/2008 |

*Primary Examiner* — Aurel Prifti
(74) *Attorney, Agent, or Firm* — F. Chau & Associates, LLC

(57) ABSTRACT

A semiconductor device includes a status data signal generating unit receiving a status value of a processor and converting the status value into a status data signal, and a power control signal generating unit generating a power control signal for controlling power supplied from a power management integrated circuit (PMIC), the PMIC supplying power to the processor from outside of processor. The power control signal includes a power off signal for interrupting the power supplied from the PMIC and the status data signal is transmitted to the PMIC together with the power off signal.

27 Claims, 22 Drawing Sheets

(56) References Cited

U.S. PATENT DOCUMENTS

| | | | |
|---|---|---|---|
| 2012/0066535 A1* | 3/2012 | Naffziger | G06F 1/206 713/340 |
| 2012/0166839 A1* | 6/2012 | Sodhi | G06F 1/206 713/322 |
| 2012/0271481 A1* | 10/2012 | Anderson | G06F 1/206 700/299 |
| 2013/0076381 A1* | 3/2013 | Takayanagi | G01K 3/005 324/750.03 |
| 2013/0246820 A1* | 9/2013 | Branover | G06F 1/3296 713/320 |
| 2013/0328890 A1* | 12/2013 | Avkarogullari | G06F 1/3234 345/501 |
| 2014/0028377 A1 | 1/2014 | Rosik et al. | |
| 2014/0075224 A1 | 3/2014 | Lee et al. | |
| 2014/0095912 A1* | 4/2014 | Hurd | G06F 1/3234 713/323 |
| 2014/0317389 A1* | 10/2014 | Wenisch | G06F 1/20 712/229 |
| 2014/0365832 A1* | 12/2014 | Neeb | G06F 13/1673 714/43 |
| 2015/0067377 A1* | 3/2015 | Park | G06F 1/3212 713/340 |
| 2015/0106640 A1* | 4/2015 | Brackman | G06F 1/206 713/324 |
| 2016/0124476 A1* | 5/2016 | Mittal | G06F 1/3206 713/320 |

* cited by examiner

1200

1300

1400

SEMICONDUCTOR DEVICE, SEMICONDUCTOR SYSTEM, AND METHOD FOR CONTROLLING THE SAME

CROSS-REFERENCE TO RELATED APPLICATION

This application claims priority to Korean Patent Application No. 10-2014-0116257 filed on Sep. 2, 2014 in the Korean Intellectual Property Office, and all the benefits accruing therefrom under 35 U.S.C. 119, the disclosure of which in its entirety is incorporated by reference herein.

BACKGROUND

1. Technical Field

Embodiments of the present inventive concept relate to a semiconductor device, a semiconductor system and a method for controlling the same.

2. Discussion of Related Art

A power management integrated circuit (PMIC) supplies power to various kinds of semiconductor devices, including a processor. For example, the PMIC supplies power to an application processor and interrupts power supplied to the processor in an abnormal situation in which there is a probability of the application processor malfunctioning or being damaged. However, when the power supplied to the application processor is interrupted, information on a status of the processor immediately before the power supplying is interrupted may be required to analyze or investigate a cause of a malfunction or a damage of the processor.

SUMMARY

At least one embodiment of the present inventive concept provides a semiconductor device, which can retain status data of a processor immediately before power supplied to the processor is interrupted.

At least one embodiment of the present inventive concept provides a semiconductor system, which can retain status data of a processor immediately before power supplied to the processor is interrupted.

At least one embodiment of the present inventive concept provides a method for controlling a semiconductor device, which can retain status data of a processor immediately before power supplied to the processor is interrupted.

According to an exemplary embodiment of the present inventive concept, there is provided a semiconductor device including a status data signal generating unit receiving a status value of a processor and converting the status value into a status data signal; and a power control signal generating unit generating a power control signal for controlling power supplied from a power management integrated circuit (PMIC), the PMIC supplying power to the processor from outside the processor, wherein the power control signal includes a power off signal for interrupting the power supplied from the PMIC and the status data signal is transmitted to the PMIC together with the power off signal.

According to an exemplary embodiment of the present inventive concept, there is provided a semiconductor device including a power control signal receiving unit receiving a power control signal for controlling power supplied to a processor and a status data signal of the processor from the processor; a power supplying unit supplying power to the processor or interrupting the power supplied to the processor according to the power control signal; and a status data storing unit storing status data of the processor acquired from the status data signal of the processor.

According to an exemplary embodiment of the present inventive concept, there is provided a semiconductor system including a power management integrated circuit (PMIC) supplying power to a processor from outside the processor; and a PMIC controller controlling power supplied to the processor from the PMIC by transmitting a power on signal or power off signal, wherein the PMIC controller collects status data of the processor and transmits the power off signal to the PMIC together with the status data of the processor, and wherein the PMIC stores the status data of the processor received together with the power off signal in the PMIC and interrupts the power supplied to the processor according to the received power off signal.

According to an exemplary embodiment of the present inventive concept, there is provided a method for controlling a semiconductor device, the method including monitoring a temperature of a processor and generating a power off signal for interrupting power supplied to the processor from a power management integrated circuit (PMIC) when a temperature value of the temperature exceeds a preset critical value; converting the temperature value into a temperature data signal; transmitting the temperature data signal to the PMIC together with the power off signal; storing the temperature data acquired from the temperature data signal in a register in the PMIC; and interrupting power supplying from the PMIC to the processor according to the power off signal.

According to an exemplary embodiment of the present inventive concept, there is provided a semiconductor system including a processor and a PMIC. The processor is configured to format a signal to include a start bit, a temperature value of the processor, at least one bit of a first logic level, and a power control signal of the first logic level, when a temperature of the processor exceeds a predefined value and otherwise sets the power control signal to have a second logic level different from the first logic level. The PMIC is configured to stop supplying power to the processor after detecting the start bit, and detecting the power control signal of the first logic level followed by the at least one bit, and provide the power to the processor after detecting the power control signal of the second logic level.

BRIEF DESCRIPTION OF THE DRAWINGS

The present inventive concept will become more apparent by describing in detail exemplary embodiments thereof with reference to the attached drawings in which.

DETAILED DESCRIPTION

Figure 1:
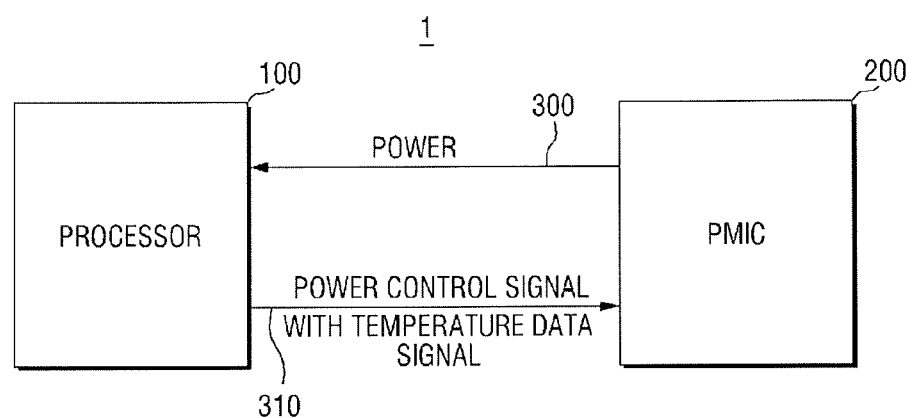
FIG. 1 is a schematic view for explaining a semiconductor system according to an exemplary embodiment of the present inventive concept.

The present inventive concept and methods of accomplishing the same may be understood more readily by reference to the following detailed description of exemplary embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art. Like reference numerals refer to like elements throughout the specification. As used herein, the singular forms of "a", "an" and "the" are intended to include the plural forms as well, unless the context clearly indicates otherwise. It will be understood that when an element or layer is referred to as being "on", "connected to" or "coupled to" another element or layer, it can be directly on, connected or coupled to the other element or layer or intervening elements or layers may be present.

As will be appreciated by one skilled in the art, aspects of the present disclosure may be embodied as a system, a method, or a computer program product. Accordingly, aspects of the present disclosure may take the form of an entirely hardware embodiment, an entirely software embodiment (including firmware, resistant software, micro-code, etc.), or an embodiment combining software and hardware aspects that may all generally be referred to herein as a "circuit", "module", or "system". Furthermore, aspects of the present disclosure may take the form of a computer program product embodied in one or more computer readable medium(s) having computer readable program code embodied thereon.

FIG. 1 is a schematic diagram for explaining a semiconductor system according to an exemplary embodiment of the present inventive concept.

Referring to FIG. 1, the semiconductor system 1 according to an embodiment of the present inventive concept includes a processor 100 and a power management integrated circuit (PMIC) 200. The PMIC 200 may include a DC to DC converter to allow dynamic voltage scaling. The PMIC 200 may provide voltage regulation. The PMIC 200 may include an oscillator to provide a clock signal.

The processor 100 interprets instructions and generally controls a computing device. In some embodiments of the present inventive concept, the processor 100 includes an application processor mounted in a mobile device, but aspects of the present inventive concept are not limited thereto. In some embodiments of the present inventive concept, the processor 100 includes a central processing unit (CPU), a graphic processing unit (GPU), and may be mounted in a personal computer, a server computer, or a portable computer.

The PMIC 200 supplies power to various components of the semiconductor system 1 according to an embodiment of the present inventive concept, including the processor 100. In some embodiments of the present inventive concept, the PMIC 200 provided outside the processor 100 supplies power 300 to the processor 100 to drive the processor 100. Meanwhile, the PMIC 200 may interrupt the power 300 supplied to the processor 100 to make the processor 100 stop operating in a particular situation. Here, the particular situation may include a case in which it is necessary to make the processor 100 stop operating in response to a user' request or requests from other components of the semiconductor system 1 according to an embodiment of the present inventive concept, and a case in which there is a probability of the processor 100 malfunctioning or being damaged. For example, in a case where the processor 100 is overheated to reach an extremely high temperature so as not to operate or to be damaged, the PMIC 200 may urgently interrupt the power 300 supplied to the processor 100.

In order to control the power 300 supplied to the processor 100, the processor 100 transmits a power control signal to the PMIC 200. In some embodiments of the present inventive concept, the power control signal includes a power on signal for maintaining the power supplied from the PMIC 200 to the processor 100 and a power off signal for interrupting the power supplied from the PMIC 200 to the processor 100. For example, while the processor 100 is transmitting the power on signal to the PMIC 200, the PMIC 200 supplies the power 300 to the processor 100. In addition, while the processor 100 is transmitting the power off signal to the PMIC 200, the PMIC 200 interrupts the power 300 supplied to the processor 100.

In a case where it is necessary to interrupt the power supplied to the processor 100 when the temperature of the processor 100 exceeds a preset critical value, the processor 100 may transmit the power off signal to the PMIC 200. In the semiconductor system 1 according to an embodiment of the present inventive concept, the processor 100 transmits the temperature data signal to the PMIC 200 together with the power off signal. Here, the temperature data signal is a signal obtained by converting a temperature value of the processor 100 into an electrical signal. That is to say, in a situation in which the power supplied to the processor 100 is interrupted, temperature data of the processor 100 is transmitted to the PMIC 200 immediately before the power of the PMIC 200 is interrupted. The temperature data of the processor 100 transmitted to the PMIC 200 may later be used to analyze or investigate a cause of an interrupted operation of the processor 100, e.g., a cause of a malfunction or a damage of the processor 100.

As described above, in the semiconductor system 1 according to an embodiment of the present inventive concept, when the power supplied to the processor 100 is urgently interrupted, information required for a debugging operation for investigating and correcting the cause of the malfunction or damage of the processor 100, that is, status data of the processor 100, may be transmitted to the PMIC 200. In particular, in the semiconductor system 1 according to an embodiment of the present inventive concept, since the power control signal and the temperature data signal 310 are transmitted to the PMIC 200 through the same channel, the information required for the debugging operation can be safely retained in an emergency without additional costs incurred. In an exemplary embodiment, the power control signal and the temperature data signal are both transmitted across a same line using time division multiplexing.

While the temperature data as the processor status data is exemplified in FIG. 1, as will later be described with reference to FIGS. 15 to 18, the processor status data is not limited to the temperature data illustrated herein. In some embodiments of the present inventive concept, the processor status data includes information on physical, electrical and chemical properties of the processor 100. In detail, the processor status data may include, for example, generation, preparation, execution, completion, and standby execution statuses for units managed by a program, a task and an operation system executed on the processor 100.

Figure 2A:
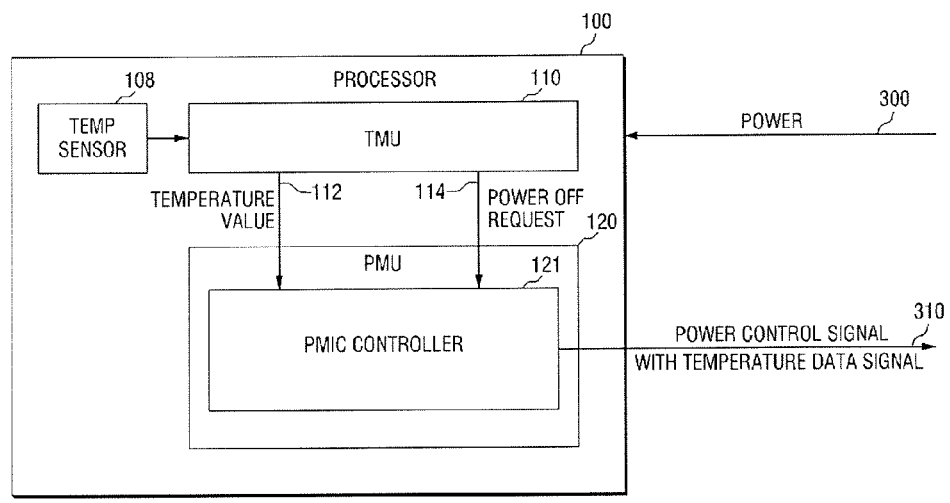
FIG. 2A is a schematic view for explaining a processor shown in FIG. 1 according to an exemplary embodiment of the present inventive concept and FIG. 2B is a schematic view for explaining a power management integrated circuit (PMIC) shown in FIG. 2A according to an exemplary embodiment of the present inventive concept.

FIG. 2A is a schematic view for explaining a processor shown in FIG. 1 according to an exemplary embodiment of the present inventive concept.

Referring to FIG. 2A, the processor 100 according to an exemplary embodiment of the present inventive concept includes a thermal management unit (TMU) 110 and a power management unit (PMU) 120. In addition, the processor 100 according to an embodiment of the present inventive concept further includes a temperature sensor 108 for measuring a temperature of the processor 100. In various embodiments of the present inventive concept, a position of the temperature sensor 108 is not limited to a particular position. For example, unlike in FIG. 2A, the temperature sensor 108 may be positioned outside the processor 100. Examples of the temperature sensor 108 include a thermistor, a thermocouple, a resistance thermometer, and a silicon bandgap temperature sensor.

The temperature management unit 110 monitors a temperature of the processor 100. That is to say, the temperature management unit 110 monitors the temperature of the processor 100 using the temperature sensor 108. When the temperature of the processor 100 monitored by the temperature management unit 110 exceeds a preset critical value, a corresponding temperature value 112 and a power off request 114 are transmitted to the power management unit 120 to be described later.

The power management unit 120 manages the power supplied to the processor 100. The power management unit 120 includes a PMIC controller 121. The PMIC controller 121 controls the PMIC 200. In detail, as described above with reference to FIG. 1, the PMIC controller 121 transmits a power on signal or a power off signal to PMIC 200, the power on signal allowing the PMIC 200 to maintain power supplying to the processor 100 and the power off signal for allowing the PMIC 200 to interrupt power supplying to the processor 100.

For example, when the temperature of the processor 100 exceeds a preset critical value, the temperature management unit 110 transmits the temperature value 112 and the power off request 114 to the power management unit 120. Then, the PMIC controller 121 receives the temperature value 112 and the power off request 114 and converts the temperature value 112 into a temperature data signal 310 that is an appropriate electrical signal to be electrically transmitted to the PMIC 200. Thereafter, the PMIC controller 121 transmits the power off signal and the temperature data signal 310 to the PMIC 200.

Figure 2B:
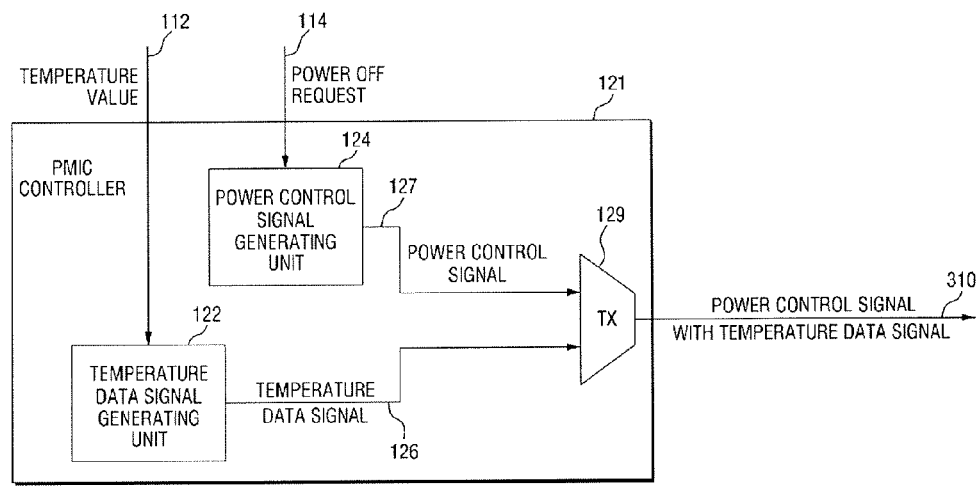
Figure 3:
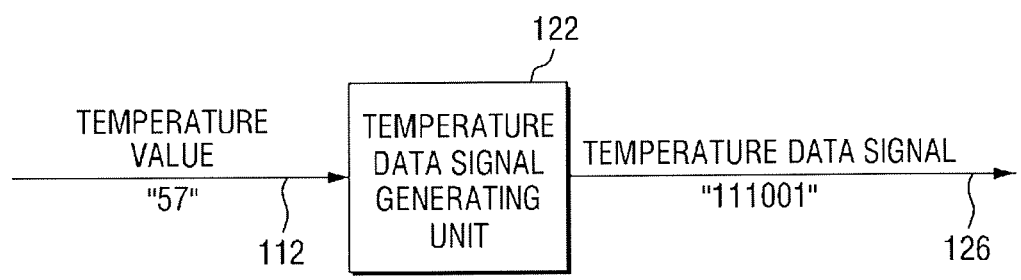
FIG. 3 is a schematic view for explaining a temperature data signal generating unit shown in FIG. 2B according to an exemplary embodiment of the present inventive concept.

FIG. 2B is a schematic view for explaining a power management integrated circuit (PMIC) shown in FIG. 2A according to an embodiment of the present inventive concept, and FIG. 3 is a schematic view for explaining a temperature data signal generating unit shown in FIG. 2B according to an embodiment of the present inventive concept.

Referring to FIG. 2B, the PMIC controller 121 shown in FIG. 2A according to an embodiment of the present inventive concept includes a temperature data signal generating unit 122 and a power control signal generating unit 124. In addition, the PMIC controller 121 shown in FIG. 2A according to an embodiment of the present inventive concept further includes a signal transmitting unit (TX) 129 for transmitting signals generated from the PMIC controller 121 to the PMIC 200. In an exemplary embodiment, the signal transmitting unit 129 is a multiplexer.

The temperature data signal generating unit 122 receives a temperature value of the processor 100 and converts the received temperature value into a temperature data signal 126. In detail, the temperature data signal generating unit 122 receives the temperature value of the processor 100 expressed in an arbitrary form and converts the same into the temperature data signal 126 that is an electrically transmitted signal. In some embodiments of the present inventive concept, the temperature data signal 126 may be a serialized data signal for serial data transmission, but is not limited thereto. As shown in FIG. 3, assuming that the temperature value of the processor 100 is "57", the temperature data signal generating unit 122 receives the temperature value of the processor 100 expressed in an arbitrary form "57" and generates a temperature data signal "111001". The temperature data signal "111001" is a serialized data signal having consecutive bits connected to each other and may be transmitted to the PMIC 200.

The power control signal generating unit 124 generates a power control signal 127 for controlling power supplied from the PMIC 200 to the processor 100. As described above, in some embodiments of the present inventive concept, the power control signal 127 may include a power on signal for maintaining the power supplied from the PMIC 200 to the processor 100 and a power off signal for interrupting the power supplied from the PMIC 200 to the processor 100. In some embodiments of the present inventive concept, the power control signal 127 may be a digital signal having values of '0' and '1'. For example, if the power control signal 127 has a value of '0', it is a power off signal, and if the power control signal 127 has a value of '1', it is a power on signal.

In this embodiment, the temperature data signal 126 generated from the temperature data signal generating unit 122 may be transmitted to the PMIC 200 together with the power control signal 127 generated from the power control signal generating unit 124. When the power control signal generating unit 124 generates a power off signal, in some embodiments of the present inventive concept, the temperature data signal 126 may be transmitted to the PMIC 200 earlier than the power off signal. For example, after the temperature data signal 126 is transmitted to the PMIC 200, a delay period occurs, and then after the delay period, the power off signal is transmitted to the PMIC 200. Accordingly, when the power supplied to the processor 100 is interrupted, the temperature data required for a debugging operation of the processor 100, that is, the temperature data signal 126, may be transmitted to the PMIC 200 to then be safely retained.

Figure 4:
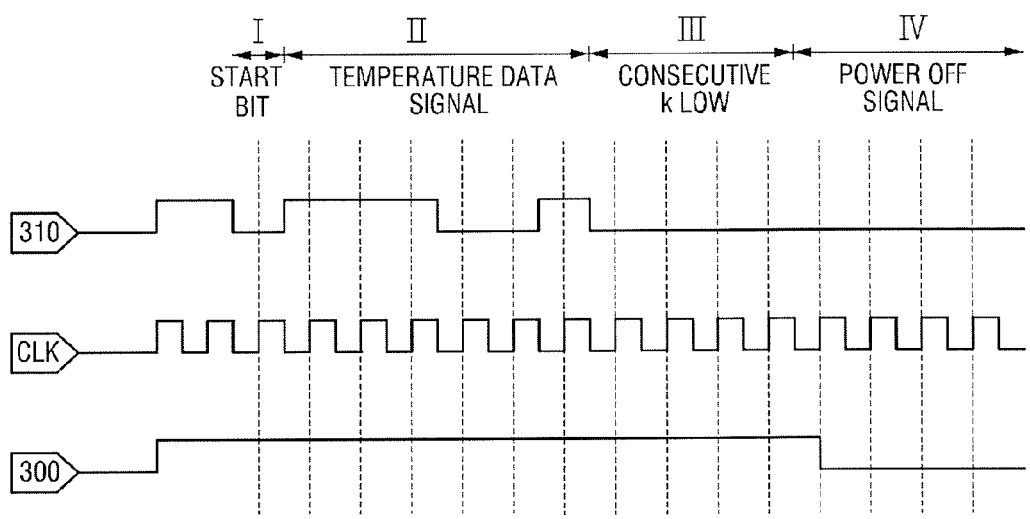
FIG. 4 illustrates an operation of a semiconductor system according to an exemplary embodiment of the present inventive concept.

FIG. 4 illustrates an operation of a semiconductor system according to an exemplary embodiment of the present inventive concept.

In detail, FIG. 4 illustrates a timing relationship between each of a power control signal and a temperature data signal 310, a transmission clock (CLK), and power 300 supplied from the PMIC 200 to the processor 100. Here, it is assumed that the temperature data signal generating unit 122 receives a temperature value expressed in an arbitrary form "57" and generates a serialized temperature data signal "111001". It is also assumed that the power off signal of the power control signal is expressed as '0' and the power on signal is expressed as '1'. The arbitrary form may correspond to a decimal value in Celsius, Fahrenheit, etc. The serialized temperature data signal may correspond to a binary representation of the decimal value.

Referring to FIG. 4, the serialized temperature data signal includes a start bit (e.g., '0'). The start bit is used to distinguish the serialized temperature data signal from the power on signal of the power control signal. That is to say, referring to the line of the power control signal and the temperature data signal 310 corresponding to a period I, a signal maintained at a value '1' before the period I, that is, the power on signal transmitted from the PMIC controller 121 to the PMIC 200 is changed to '0' in the period I. That is to say, the PMIC controller 121 transmits the temperature data of the processor 100 to the PMIC 200. In addition, in order to allow the PMIC 200 to interrupt the power supplied to the processor 100, the PMIC controller 121 transmits the start bit (period I) and then transmits the temperature data signal (period II). Accordingly, the PMIC 200 detects the start bit to recognize that the temperature data signal is received from the PMIC controller 121.

The PMIC controller 121 transmits the temperature data signal (that is, "111001") as a serial signal and then transmits the power off signal (that is, "0") (periods III and IV). The PMIC 200 being in the middle of receiving the temperature data signal recognizes the received signal as a power off signal, and not as the temperature data signal, when the number of "0"s exceeds a predefined value (i.e., "k"). Accordingly, the PMIC 200 interrupts the power supplied to the processor 100 (period IV on the line of the power 300).

Figure 5:
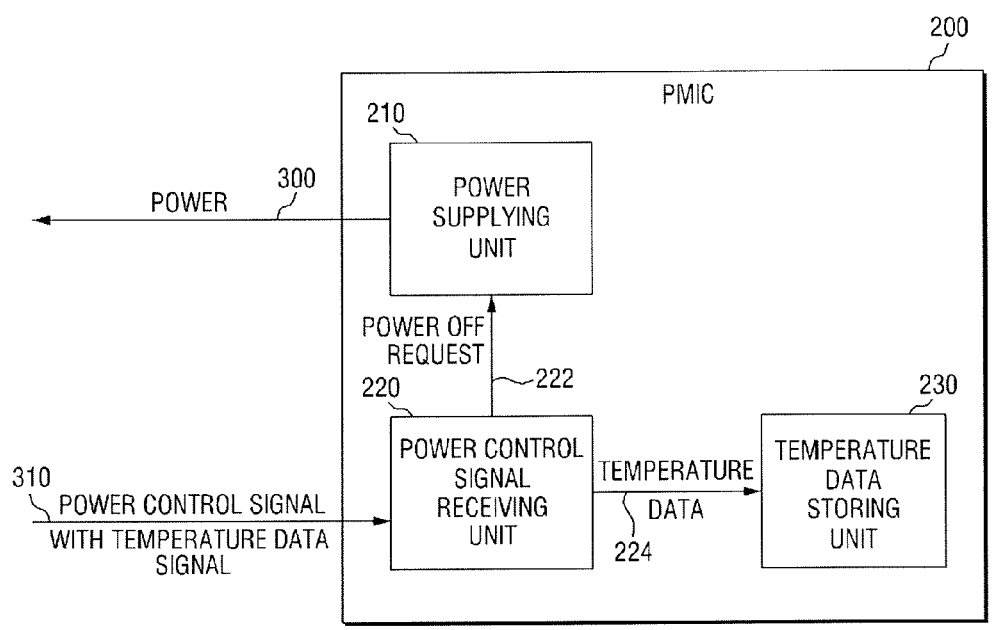
FIG. 5 is a schematic view for explaining a PMIC shown in FIG. 1 according to an exemplary embodiment of the present inventive concept.

FIG. 5 is a schematic view for explaining a PMIC shown in FIG. 1 according to an exemplary embodiment of the present inventive concept.

Referring to FIG. 5, the PMIC 200 shown in FIG. 1 according to an embodiment of the present inventive concept includes a power supplying unit 210, a power control signal receiving unit 220 and a temperature data storing unit 230.

The power supplying unit 210 supplies the power 300 to the processor 100 or interrupts the power 300 to the processor 100. In detail, the power supplying unit 210 supplies the power 300 to the processor 100 or interrupts the power 300 to the processor 100 according to the power control signal received from the PMIC controller 121 of the processor 100.

The power control signal receiving unit 220 receives the power control signal and the temperature data signal 310 from the PMIC controller 121 of the processor 100. In some embodiments of the present inventive concept in which the power control signal is a power off signal, the power control signal receiving unit 220 may receive the temperature data signal earlier than the power off signal. In some embodiments of the present inventive concept, the power control signal receiving unit 220 is able to distinguish the temperature data signal from the power off signal in the signals received from the PMIC controller 121. Thereafter, the power control signal receiving unit 220 may transmit the distinguished temperature data signal to the temperature data storing unit 230 and may transmit a power off request to the power supplying unit 210 according to the distinguished power off signal.

The temperature data storing unit 230 stores the temperature data of the processor 100, acquired from the temperature data signal received by the power control signal receiving unit 220. In some embodiments of the present inventive concept, the temperature data signal received by the power control signal receiving unit 220 may be a serialized data signal and the temperature data of the processor 100 stored in the temperature data storing unit 230 may be acquired by inversely serializing the serialized data signal. Meanwhile, in some embodiments of the present inventive concept in which the power control signal is a power off signal, the temperature data storing unit 230 may store the temperature data of the processor 100 before the power supplying unit 210 interrupts the power supplied to the processor 100. In some embodiments of the present inventive concept, the temperature data storing unit 230 may include a register incorporated in the PMIC 200 or an internal memory.

Figure 6:
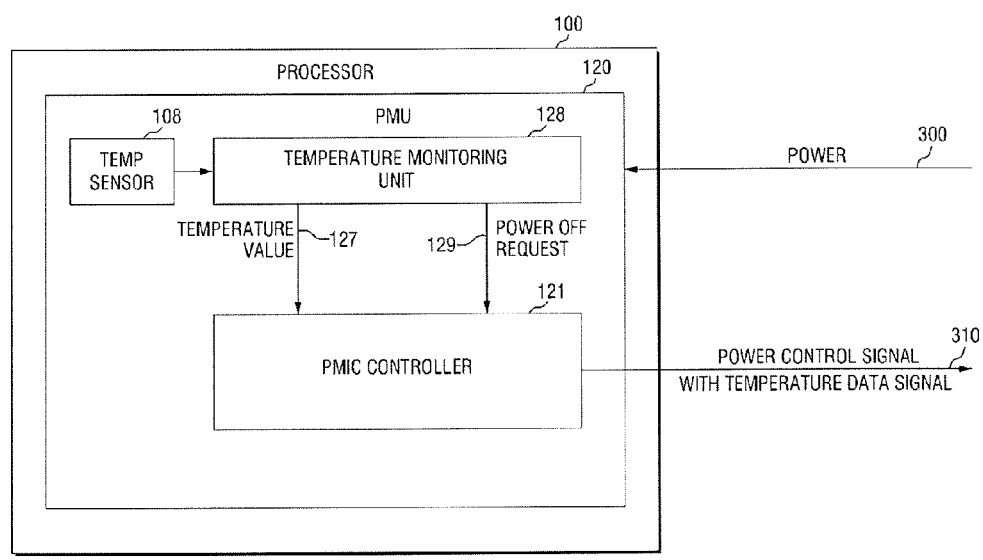
FIG. 6 is a schematic view for explaining a PMIC controller according to an exemplary embodiment of the present inventive concept.

FIG. 6 is a schematic view for explaining a PMIC controller according to an exemplary embodiment of the present inventive concept.

Referring to FIG. 6, while the power management unit 120 of the processor 100 includes only the PMIC controller 121 in the embodiment illustrated in FIG. 2A, the power management unit 120 of the processor 100 further includes a temperature monitoring unit 128 in addition to the PMIC controller 121.

The temperature monitoring unit 128, provided in the power management unit 120, monitors a temperature of the processor 100. That is to say, the temperature monitoring unit 128 monitors the temperature of the processor 100 using a temperature sensor 108. As the result of monitoring the temperature of the processor 100, when the temperature of the processor 100 exceeds a preset critical value, the temperature monitoring unit 128 transmits a corresponding temperature value 127 and a power off request 129 to the PMIC controller 121. In detail, when the temperature of the processor 100 exceeds the preset critical value, the temperature monitoring unit 128 transmits the corresponding temperature value 127 to the temperature data signal generating unit 122 and transmits the power off request 129 to the power control signal generating unit 124.

Figure 7:
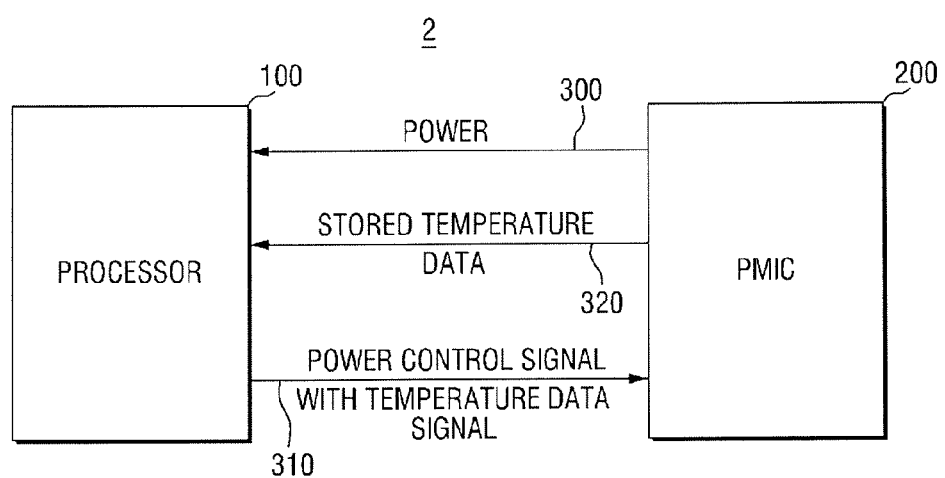
FIG. 7 is a schematic view for explaining a semiconductor system according to an exemplary embodiment of the present inventive concept.
Figure 8:
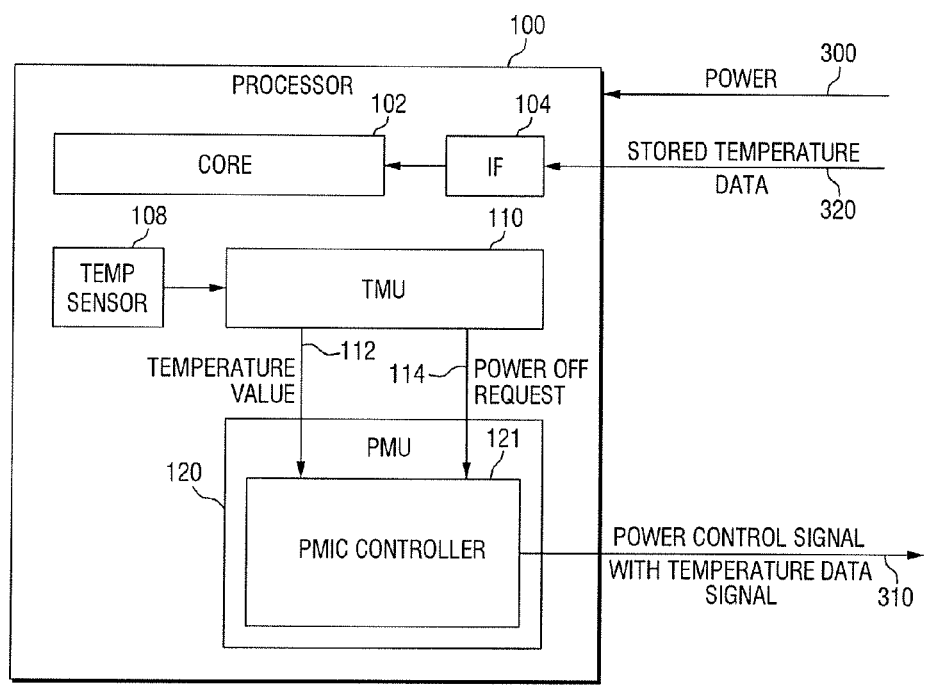
FIG. 8 is a schematic view for explaining a processor shown in FIG. 7 according to an exemplary embodiment of the present inventive concept.
Figure 9:
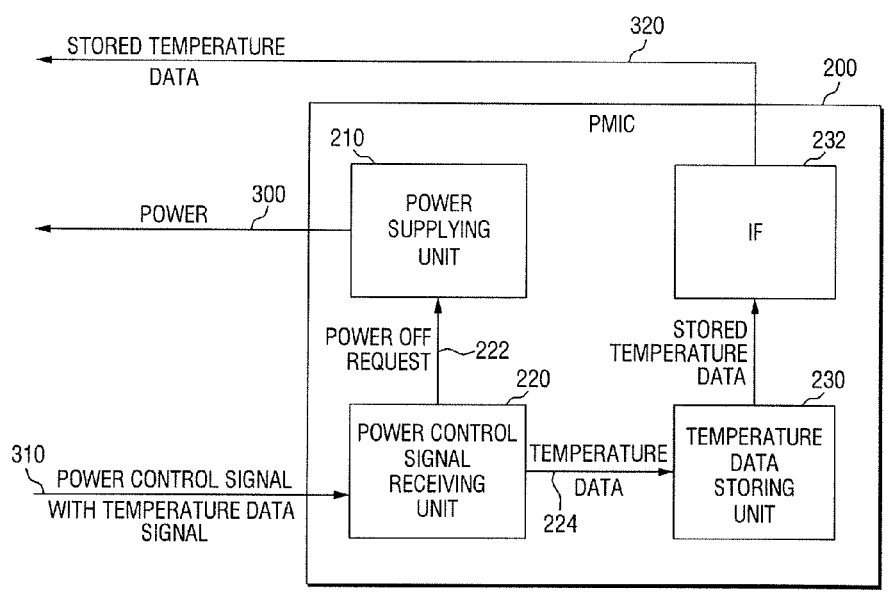
FIG. 9 is a schematic view for explaining a PMIC shown in FIG. 7 according to an exemplary embodiment of the present inventive concept.

FIG. 7 is a schematic view for explaining a semiconductor system according to an exemplary embodiment of the present inventive concept, FIG. 8 is a schematic view for explaining a processor shown in FIG. 7 according to an exemplary embodiment of the present inventive concept, FIG. 9 is a schematic view for explaining a PMIC shown in FIG. 7 according to an exemplary embodiment of the present inventive concept.

Referring to FIG. 7, the semiconductor system 2 according to an exemplary embodiment of the present inventive concept is different from the semiconductor system 1 according to the embodiment illustrated in FIG. 1 in that temperature data stored in a PMIC 200 is transmitted back to a processor 100.

When it is necessary to interrupt power supplied to the processor 100 because a temperature of the processor 100 exceeds a preset critical value, the processor 100 may transmit a power off signal and a temperature data signal 310 to the PMIC 200. That is to say, in a situation in which the power supplied to the processor 100 is interrupted, temperature data of the processor 100 is transmitted to the PMIC 200 immediately before the power supplied to the processor 100 is interrupted. The temperature data of the processor 100 transmitted to the PMIC 200 is stored in the PMIC 200, and when power supplied to the processor 100 is resumed, the temperature data stored in the PMIC 200 is transmitted to the processor 100. Thereafter, the processor 100 may use the received temperature data to analyze or investigate a cause of an interrupted operation of the processor 100, e.g., a cause of a malfunction or a damage of the processor 100.

Referring to FIGS. 8 and 9, in some embodiments of the present inventive concept, a temperature data signal transmitted from the PMIC controller 121 of the processor 100 is received by a power control signal receiving unit 220 of the PMIC 200. The temperature data of the processor 100, acquired from the temperature data signal, is stored in a temperature data storing unit 230 of the PMIC 200 while the power supplied to the processor 100 is interrupted, and may be transmitted to the processor 100 when the power supplied to the processor 100 is resumed. Here, the temperature data stored in the temperature data storing unit 230 may be transmitted to a core 102 of the processor 100 through an interface 232 of the PMIC 200 and an interface 104 of the processor 100. The core 102 may analyze a cause of an interrupted operation of the processor 100, e.g., a cause of a malfunction or a damage of the processor 100.

Figure 10:
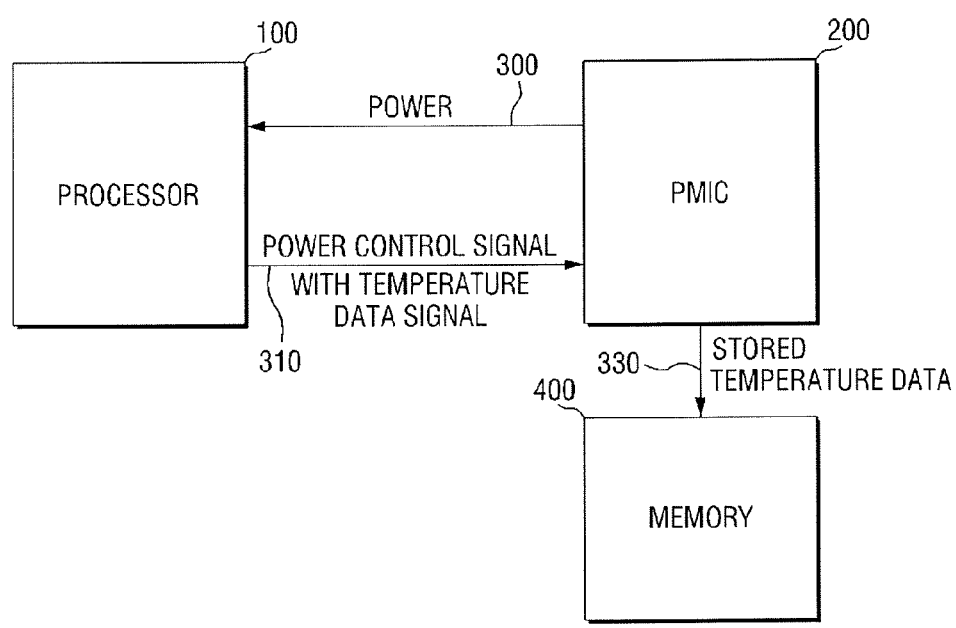
FIG. 10 is a schematic view for explaining a semiconductor system according to an exemplary embodiment of the present inventive concept.
Figure 11:
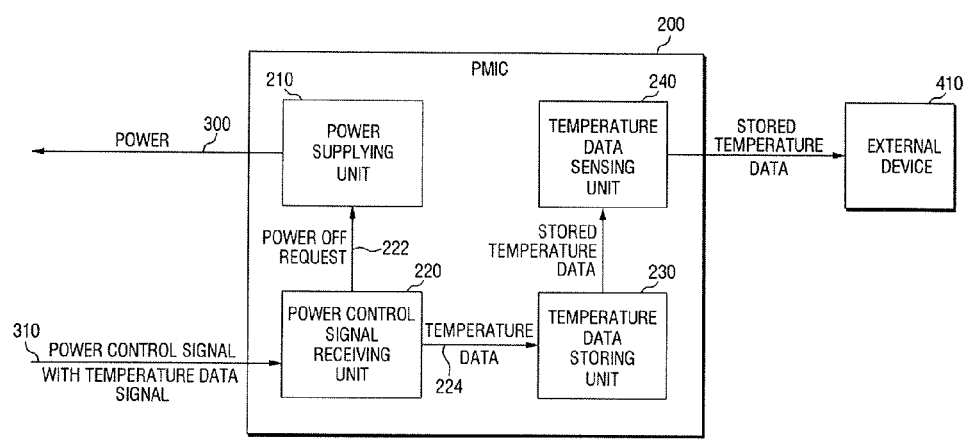
FIG. 11 is a partially schematic view for explaining a semiconductor system according to an exemplary embodiment of the present inventive concept.

FIG. 10 is a schematic view for explaining a semiconductor system according to an exemplary embodiment of the present inventive concept and FIG. 11 is a partial schematic view for explaining a semiconductor system according to an exemplary embodiment of the present inventive concept.

Referring to FIG. 10, the semiconductor system 3 according to an embodiment of the present inventive concept is different from the semiconductor system 1 according to the embodiment illustrated in FIG. 1 in that temperature data stored in a PMIC 200 is transmitted back to a memory 400.

When power supplied to the processor 100 is interrupted, temperature data of the processor 100 transmitted to the PMIC 200 immediately before the power of the PMIC 200 is interrupted may be stored in the PMIC 200 and the temperature data stored in the PMIC 200 may then be transmitted to the memory 400 provided outside the PMIC 200. In this case, the memory 400 may be accessed by a data analyzing device for analyzing the temperature data stored in the processor 100 or the memory 400. Thereafter, the processor 100 or the data analyzing device may read the temperature data stored in the memory 400 to analyze or investigate a cause of an interrupted operation of the processor 100, e.g., a cause of a malfunction or a damage of the processor 100.

Referring to FIG. 11, in some embodiments of the present inventive concept, a temperature data signal transmitted from a PMIC controller 121 of the processor 100 is received by a power control signal receiving unit 220 of the PMIC 200. The temperature data of the processor 100, acquired from the temperature data signal, is stored in a temperature data storing unit 230 of the PMIC 200 while the power supplied to the processor 100 is interrupted, and may be transmitted to an external device 410 of the PMIC 200 through a temperature data sensing unit 240. In some embodiments of the present inventive concept, the external device may be a data analyzing device for analyzing the temperature data of the processor 100.

Figure 12:
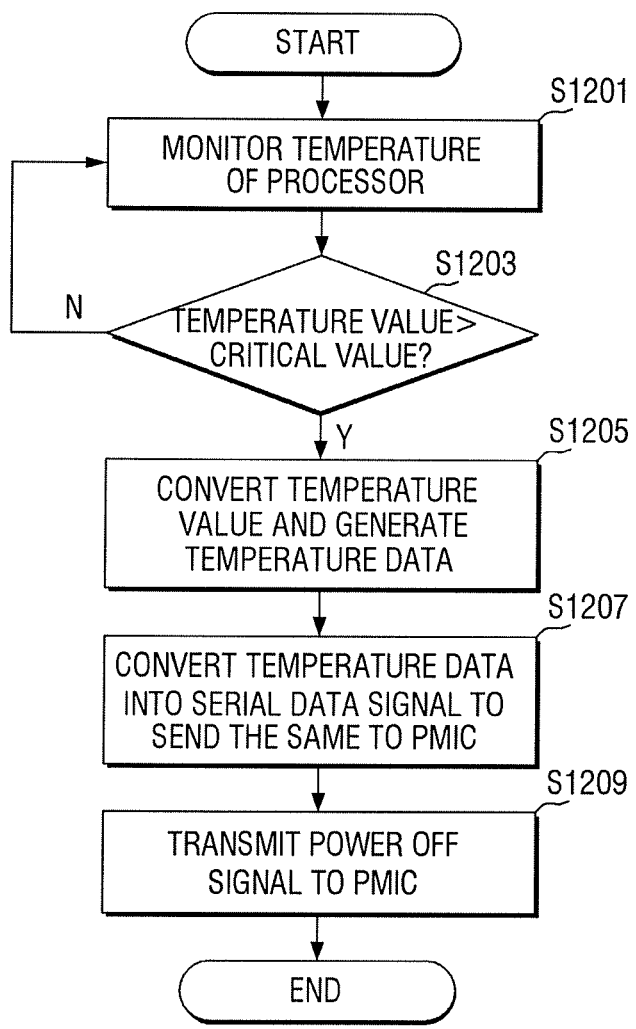
FIG. 12 is a flowchart for explaining a method for controlling a semiconductor device according to an exemplary embodiment of the present inventive concept.

FIG. 12 is a flowchart for explaining a method for controlling a semiconductor device according to an exemplary embodiment of the present inventive concept.

Referring to FIG. 12, the method for controlling a semiconductor device according to an embodiment of the present inventive concept includes monitoring a temperature of a processor 100 (S1201) and determining whether a temperature value of the processor 100 exceeds a preset critical value (S1203). If the temperature value of the processor 100 exceeds a preset critical value (S1203, Y), a power off signal for interrupting power supplied to the processor 100 is generated and the temperature value is converted to generated a temperature data signal (S1205). Next, the temperature data signal is transmitted to the PMIC 200 as a serial signal (S1207), and the power off signal is transmitted to the PMIC 200 (S1209).

In some embodiments of the present inventive concept, the transmitting of the temperature data signal and the power off signal to the PMIC 200 includes transmitting the temperature data signal to the PMIC 200 through the same channel with the power off signal.

Figure 13:
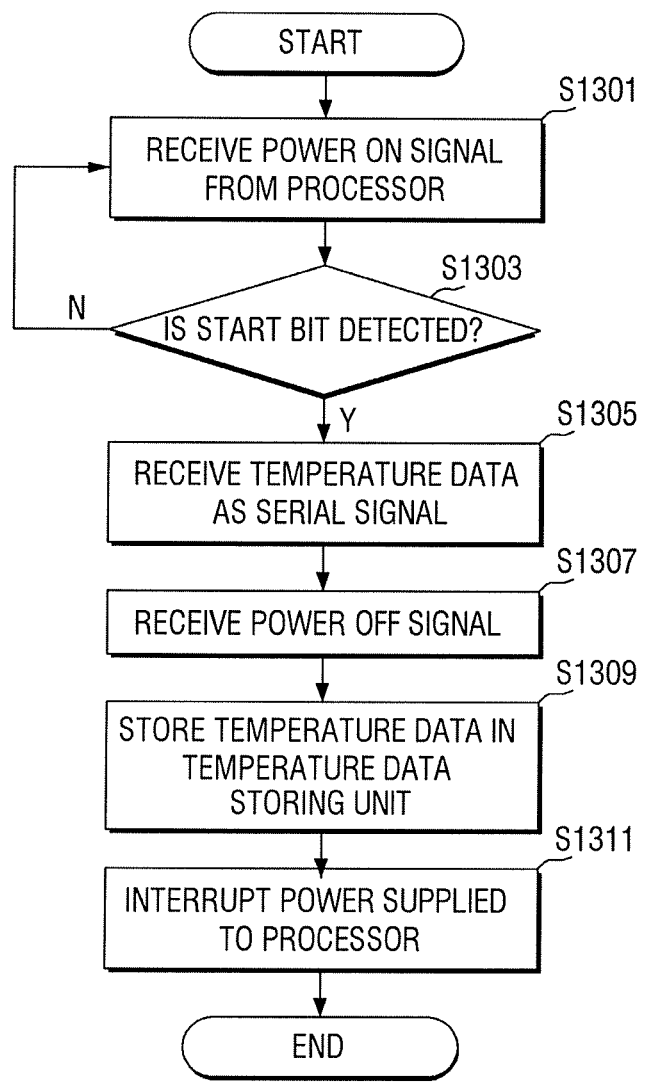
FIG. 13 is a flowchart for explaining a method for controlling a semiconductor device according to an exemplary embodiment of the present inventive concept.

FIG. 13 is a flowchart for explaining a method for controlling a semiconductor device according to an exemplary embodiment of the present inventive concept.

Referring to FIG. 13, the method for controlling a semiconductor device according to an embodiment of the present inventive concept includes supplying power to a processor 100 while receiving a power on signal from the processor 100 (S1301) and performing a detection to determine whether a start bit has been received (S1305). If a start bit is detected from the power on signal (S1303, Y), a temperature data signal of the processor 100 is received as a serial signal (S1305), and a power off signal is then received (S1307). Thereafter, temperature data acquired from the temperature data signal is stored in a data storing unit 230 (S1309) and the power supplied to the processor 100 is then interrupted (S1311).

In some embodiments of the present inventive concept, the storing of the temperature data in the data storing unit 230 include storing the temperature data in a register incorporated in the PMIC 200.

Figure 14:
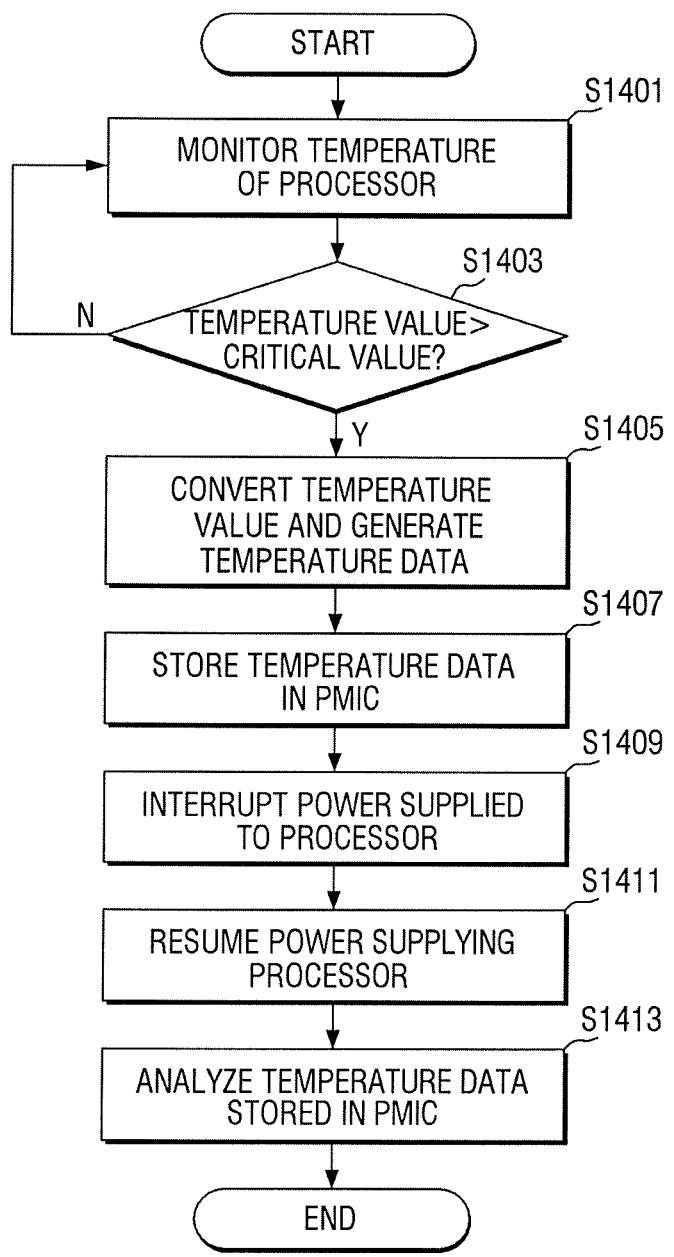
FIG. 14 is a flowchart for explaining a method for controlling a semiconductor device according to an exemplary embodiment of the present inventive concept.

FIG. 14 is a flowchart for explaining a method for controlling a semiconductor device according to an exemplary embodiment of the present inventive concept.

Referring to FIG. 14, the method for controlling a semiconductor device according to still an exemplary embodiment of the present inventive concept includes monitoring a temperature of a processor 100 (S1401) and determining whether a temperature value of the processor 100 exceeds a preset critical value (S1403). If the temperature value of the processor 100 exceeds a preset critical value (S1403, Y), the temperature value of the processor 100 is converted to generate temperature data (S1405). Next, the generated temperature data is stored within the PMIC 200 (e.g., a register incorporated in the PMIC 200) (S1407), and power supplied to the processor 100 is interrupted (S1409). Next, after the PMIC 200 resumes supplying power to the processor 100 (S1411), the temperature data stored in the PMIC 200 is analyzed (S1413). For example, when the temperature data is stored in a register incorporated in the PMIC 200, the temperature data stored in the register is analyzed.

The method for controlling a semiconductor device according to an exemplary embodiment of the present inventive concept further includes transmitting the temperature data stored in the register incorporated in the PMIC 200 to the processor 100.

Figure 15:
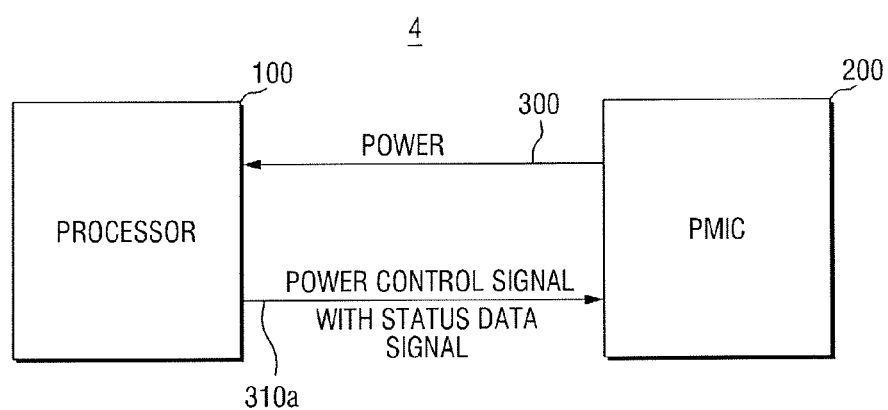
FIG. 15 is a schematic view for explaining a semiconductor system according to an exemplary embodiment of the present inventive concept.
Figure 16:
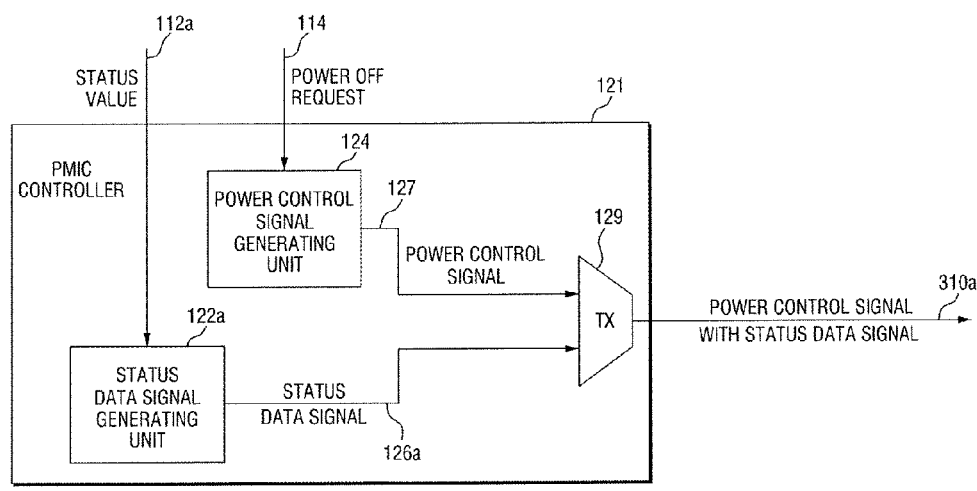
FIG. 16 is a schematic view for explaining a PMIC controller shown in FIG. 15 according to an exemplary embodiment of the present inventive concept.
Figure 17:
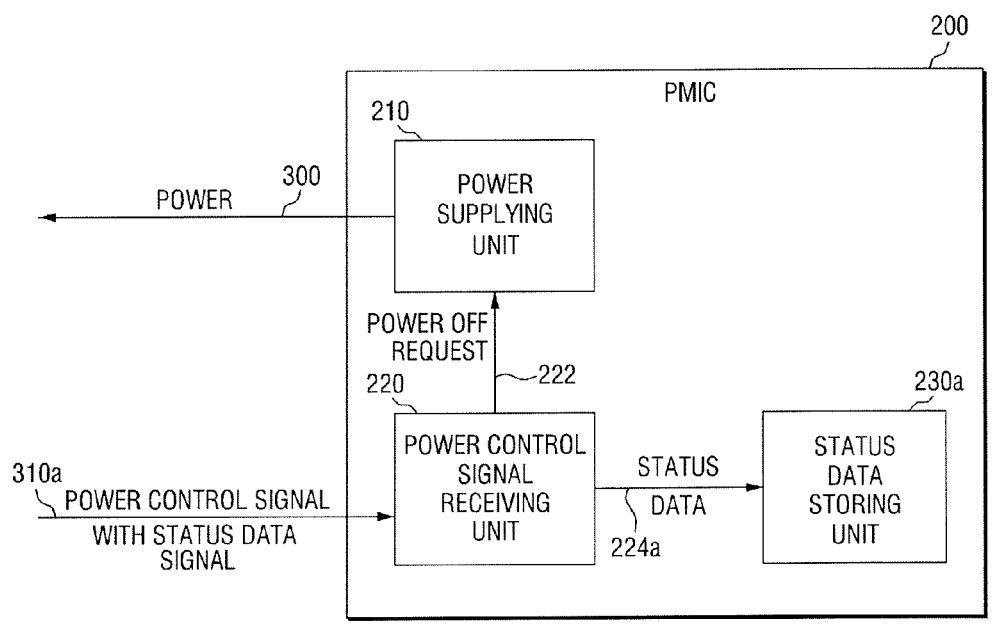
FIG. 17 is a schematic view for explaining a PMIC shown in FIG. 15 according to an exemplary embodiment of the present inventive concept.

FIG. 15 is a schematic view for explaining a semiconductor system according to an exemplary embodiment of the present inventive concept, FIG. 16 is a schematic view for explaining a PMIC controller shown in FIG. 15 according to an exemplary embodiment of the present inventive concept and FIG. 17 is a schematic view for explaining a PMIC shown in FIG. 15 according to an exemplary embodiment of the present inventive concept.

Referring to FIGS. 15 to 17, the illustrated embodiment is different from the embodiment illustrated in FIG. 1 in view of a configuration of a processor 100. That is to say, a PMIC controller 121 includes a status data signal generating unit 122a and a power control signal generating unit 124, and a power control signal and a status data signal 310a are transmitted from the PMIC controller 121 to the PMIC 200. In this embodiment, the status data signal generating unit 122a receives a status value of the processor 100 and converts the status value into a status data signal. In some embodiments of the present inventive concept, the status value of the processor 100 includes temperature data of the processor 100, including values of measurable physical, electrical and chemical properties of the processor 100. In detail, the processor status data may include, for example, generation, preparation, execution, completion, and standby execution statuses for units managed by a program, a task and an operation system executed on the processor 100.

In this embodiment, the PMIC 200 includes a power supplying unit 210, a power control signal receiving unit 220 and a status data storing unit 230a. The power control signal receiving unit 220 is capable of distinguishing the status data signal from a power off signal among signals received from the PMIC controller 121. Next, the power control signal receiving unit 220 transmits the distinguished status data signal to the status data storing unit 230a and may transmit a power off request to the power supplying unit 210 according to the distinguished power off signal. Meanwhile, the status data storing unit 230a stores processor status data, acquired from the status data signal received by the power control signal receiving unit 220.

In this embodiment, the status data signal of the processor 100 may be transmitted to the PMIC 200 earlier than the power off signal, and the PMIC 200 may store the status data of the processor 100 before the power supplied to the processor 100 is interrupted. Meanwhile, the PMIC controller 121 converts a status value of the processor 100 into a serialized data signal by serializing the status value to then transmit the serialized data signal to the PMIC 200. The PMIC 200 may store the restored status data of the processor 100 and may inversely serialize the serialized data signal to restore the processor status data.

In addition, in this embodiment, after the power supplied to the processor 100 is resumed, the processor 100 may access the processor status data stored in the PMIC 200 or may receive the processor status data from the PMIC 200. The semiconductor device 4 according to an exemplary embodiment of the present inventive concept further includes a memory 400 provided outside the PMIC 200 and the PMIC 200 may store the processor status data in the memory 400. After the power supplied to the processor 100 is resumed, the processor 100 may read the processor status data stored in the memory 400. Operations of converting and transmitting the processor status data 100 are substantially the same as those of the previous embodiments illustrated in FIGS. 1 to 14 and repeated descriptions thereof will not be given.

Figure 18:
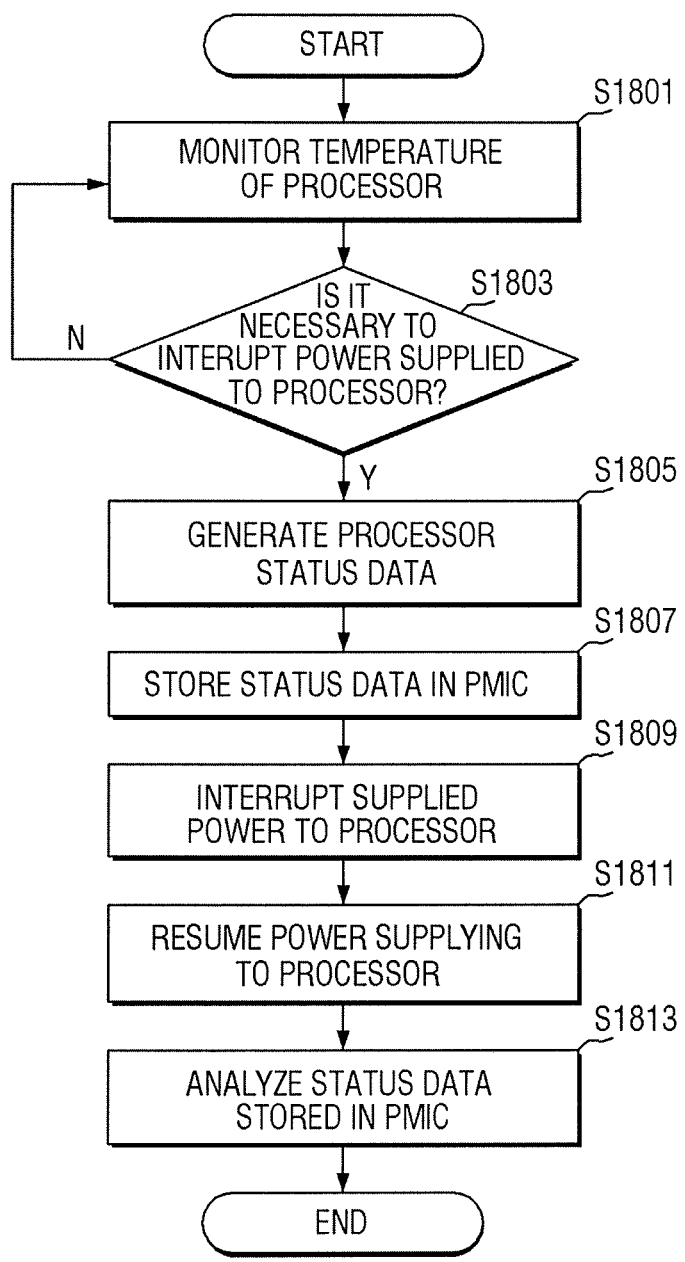
FIG. 18 is a flowchart for explaining a method for controlling a semiconductor device according to an exemplary embodiment of the present inventive concept.

FIG. 18 is a flowchart for explaining a method for controlling a semiconductor device according to an exemplary embodiment of the present inventive concept.

Referring to FIG. 18, the method for controlling a semiconductor device according to an embodiment of the present inventive concept includes monitoring a temperature of a processor 100 (S1801) and determining whether it is necessary to interrupt power supplied to the processor 100 or not according to the status of the processor 100 (S1803). If it is necessary to interrupt the power supplied to the processor 100 (S1803, Y), a status value of the processor 100 is converted to generate status data (S1805). Next, the generated status data is stored within the PMIC 200 (e.g., a register incorporated in the PMIC 200) (S1807), and power supplied to the processor 100 is interrupted (S1809). Next, after the PMIC 200 resumes supplying power to the processor 100 (S1811), the temperature data stored in the PMIC 200 is analyzed (S1813). For example, when the register is incorporated in the PMIC 200, the temperature data stored in the register is analyzed.

According to at least one embodiment of the present inventive concept, when the power supplied to the processor 100 is urgently interrupted, information required for a debugging operation for investigating and correcting a cause of a malfunction or a damage of the processor 100, that is, status data of the processor 100, may be transmitted to the PMIC 200. In particular, in the semiconductor systems according to at least one embodiment of the present inventive concept, since a power control signal and a temperature data signal 310 are transmitted to the PMIC 200 through the same channel, the information required for the debugging operation can be safely retained in an emergency without additional costs incurred.

Further, the processor 100 can be accurately diagnosed using the information, thereby facilitating maintenance and repair of the semiconductor systems.

Figure 19:
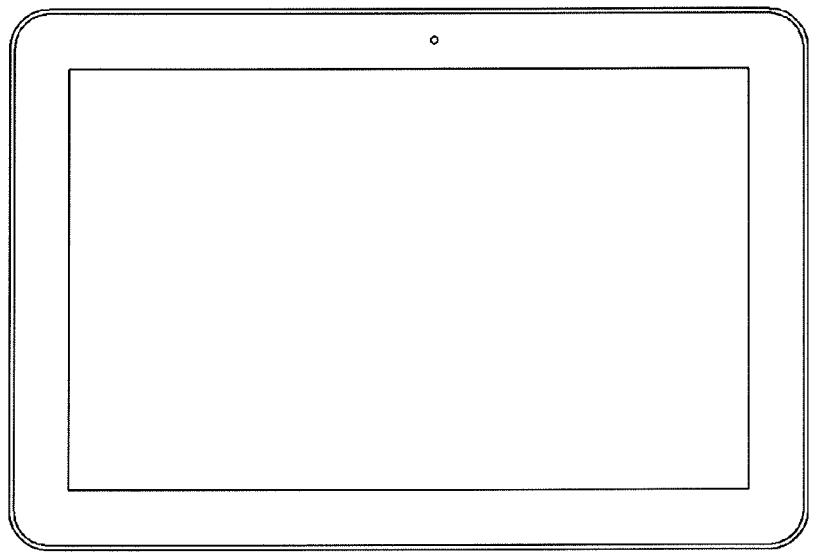
FIGS. 19 to 21 illustrate exemplary semiconductor systems according to exemplary embodiments of the present inventive concept to which semiconductor devices can be applied.
Figure 20:
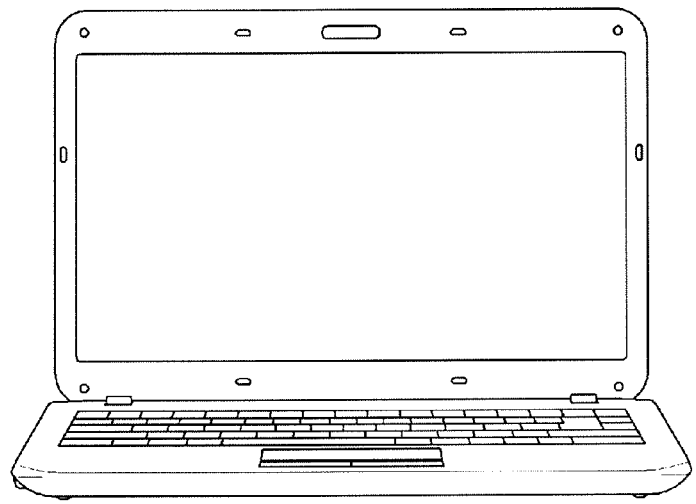
Figure 21:
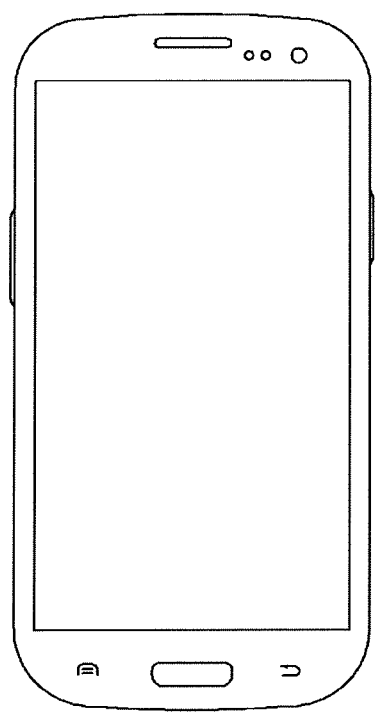

FIGS. 19 to 21 illustrate exemplary semiconductor systems according to which semiconductor devices according to embodiments of the present inventive concept can be applied.

Specifically, FIG. 19 illustrates a tablet PC 1200, FIG. 20 illustrates a notebook computer 1300, and FIG. 21 illustrates a smart phone 1400. At least one of the above described semiconductor devices, semiconductor systems and methods for controlling the semiconductor devices according to some embodiments of the present inventive concept may be used with the tablet PC 1200, the notebook computer 1300 and smart phone 1400.

In addition, at least one of the above described semiconductor devices, semiconductor systems and methods for controlling the semiconductor devices according to some embodiments of the present inventive concept can be other integrated circuits not illustrated herein. That is to say, while only the tablet PC 1200, the notebook computer 1300 and smart phone 1400 are illustrated as examples, aspects of the present inventive concept are not limited thereto. In some embodiments of the present inventive concept, the semiconductor systems can be implemented as computers, ultra mobile personal computers (UMPCs), work stations, netbooks, personal digital assistants (PDAs), portable computers, web tablets, wireless phones, mobile phones, smart phones, e-books, portable multimedia players (PMPs), portable game consoles, navigation devices, black boxes, digital cameras, 3-dimensional televisions, digital audio recorders, digital audio players, digital video recorders, digital video players, and so on.

While the present inventive concept has been particularly shown and described with reference to exemplary embodiments thereof, it will be understood by those of ordinary skill in the art that various changes in form and details may be made therein without departing from the spirit and scope of the present inventive concept.

What is claimed is:

1. A semiconductor device which includes a processor receiving power from a power management integrated circuit (PMIC) and a PMIC controller disposed in the processor, the PMIC controller comprising:
   a first signal generator receiving a status value of the processor and converting the status value into a status data signal; and
   a second signal generator generating a power off signal for interrupting the power supplied from the PMIC to the processor,
   wherein the PMIC controller transmits the status data signal together with the power off signal to the PMIC as a single signal and the status data signal indicates a status of the processor,
   wherein the status data signal is located in a first position within the single signal, the power off signal is located in a second position within the single signal, and the first position is before the second position.

2. The semiconductor device of claim 1, wherein the status data signal and the power off signal are transmitted to the PMIC through a same channel.

3. The semiconductor device of claim 1, wherein the first signal generator includes a third signal generator receiving a temperature value of the processor and converting the temperature value into the status data signal.

4. The semiconductor device of claim 3, further comprising a circuit monitoring a temperature of the processor, wherein when the temperature of the processor exceeds a preset critical value, the circuit transmits a power off request to the second signal generator and transmits the temperature value of the processor to the third signal generator.

5. The semiconductor device of claim 3, wherein the status data signal includes a serialized temperature data signal.

6. The semiconductor device of claim 5, wherein the serialized temperature data signal includes a start bit and the start bit enables the PMIC to differentiate between the serialized temperature data signal and a power on signal.

7. A semiconductor device comprising:
   a receiver for receiving a status data signal indicating a status of a processor and a power off signal for interrupting power supplied to the processor from the processor as a single signal;
   a power supply supplying power to the processor and interrupting the power supplied to the processor according to the power off signal; and
   a storage device storing status data of the processor acquired from the status data signal of the processor,
   wherein the status data signal is located in a first position within the single signal, the power off signal is located in a second position within the single signal, and the first position is before the second position.

8. The semiconductor device of claim 7, wherein the receiver transmits the status data signal to the storage device and transmits a power off request for the processor to the power supply according to the power off signal.

9. The semiconductor device of claim 7, wherein the storage device stores status data of the processor before the power supply interrupts the power supplied to the processor.

10. The semiconductor device of claim 7, wherein the status data signal is a temperature data signal of the processor and the storage device includes a section storing temperature data of the processor acquired from the temperature data signal of the processor.

11. The semiconductor device of claim 10, wherein the temperature data signal includes a serialized temperature data signal.

12. The semiconductor device of claim 11, wherein the temperature data of the processor stored in the section is acquired by inversely serializing the serialized temperature data signal.

13. The semiconductor device of claim 10, wherein the temperature data signal and the power off signal are is received through a same channel.

14. The semiconductor device of claim 10, wherein the temperature data of the processor stored in the section is sent to the processor after power supplied to the processor is resumed.

15. The semiconductor device of claim 10, further comprising a transmitter sending the temperature data stored in the section to an external device.

16. The semiconductor device of claim 15, wherein the external device includes a memory device to which the processor is accessible.

17. The semiconductor device of claim 15, wherein the external device includes a data analyzing device for analyzing the temperature data.

18. A method for controlling a semiconductor device, the method comprising:
   monitoring a temperature of a processor;
   generating a power off signal for interrupting power supplied to the processor from a power management integrated circuit (PMIC) when a temperature value of the temperature exceeds a preset critical value;
   converting the temperature value into a temperature data signal;
   generating a single signal that includes both the temperature data signal and the power off signal;
   transmitting the single signal to the PMIC;
   storing temperature data acquired from the temperature data signal in a register in the PMIC; and
   interrupting power supplied from the PMIC to the processor according to the power off signal,
   wherein the power off signal is located at a first position within the single signal, the temperature data signal is located in a second position within the single signal, and the first position is before the second position.

19. The method of claim 18, wherein the temperature data signal and the power off signal are transmitted through a same channel.

20. The method of claim 18, wherein the storing of the temperature data in the register in the PMIC comprises storing the temperature data in the register in the PMIC before the power supplied from the PMIC to the processor is interrupted.

21. The method of claim 18, wherein when the power supplied from the PMIC to the processor is resumed, further comprising analyzing the temperature data stored in the register in the PMIC.

22. The method of claim 18, wherein when the power supplied from the PMIC to the processor is resumed, further comprising sending the temperature data stored in the register in the PMIC to the processor.

23. A semiconductor device which includes a processor receiving power from a power management integrated circuit (PMIC) comprising:

a PMIC controller configured to receive a status value of the processor, convert the status value into a status data signal, generate a power off signal for interrupting the power supplied from the PMIC to the processor, and transmit the status data signal together with a power off signal to the PMIC as a single signal, wherein the status data signal indicates a status of the processor, wherein the status data signal includes a serialized temperature data signal, and wherein the serialized temperature data signal includes a start bit and the start bit enables the PMIC to differentiate between the serialized temperature data signal and a power on signal.

24. The semiconductor device of claim 23, wherein the status data signal is located in a first position within the single signal, the power off signal is located in a second position within the single signal, and the first position is before the second position.

25. The semiconductor device of claim 23, wherein the status data signal and the power off signal are transmitted to the PMIC through a same channel.

26. The semiconductor device of claim 23, wherein the PMIC controller receives a temperature value of the processor and converts the temperature value into the status data signal.

27. The semiconductor device of claim 26, further comprising a circuit monitoring a temperature of the processor, wherein when the temperature of the processor exceeds a preset critical value, the circuit transmits a power off request to the PMIC controller and transmits the temperature value of the processor to the PMIC controller.

* * * * *